July 18, 1944. A. C. JOHNSTON 2,354,125
BICYCLE
Filed Sept. 11, 1942 2 Sheets-Sheet 1
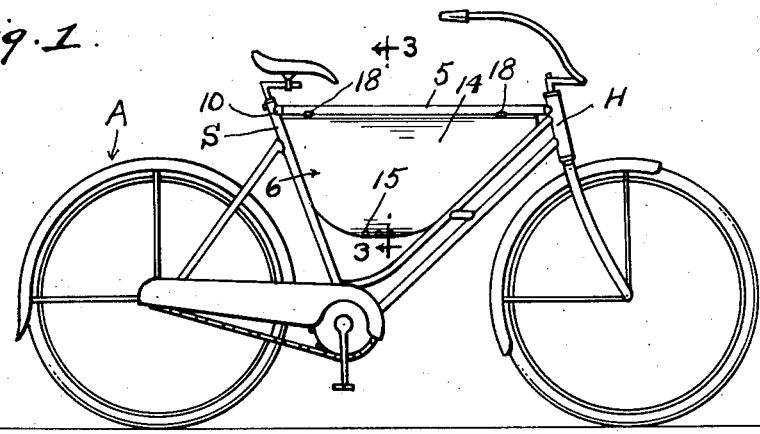
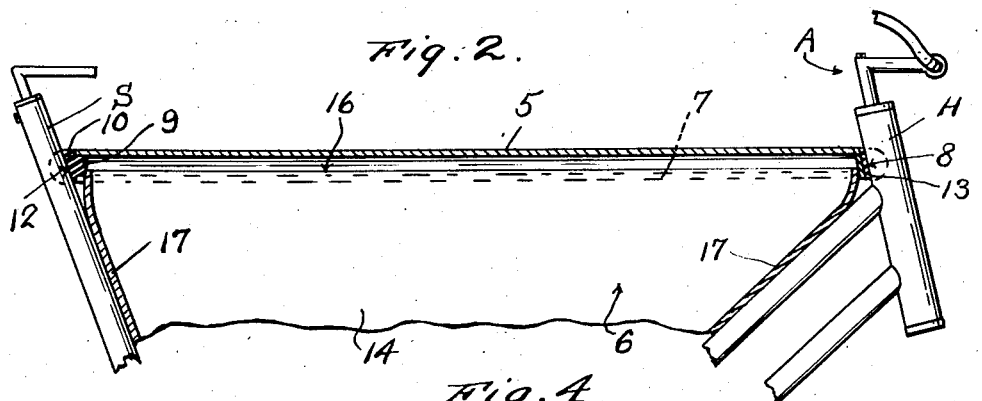
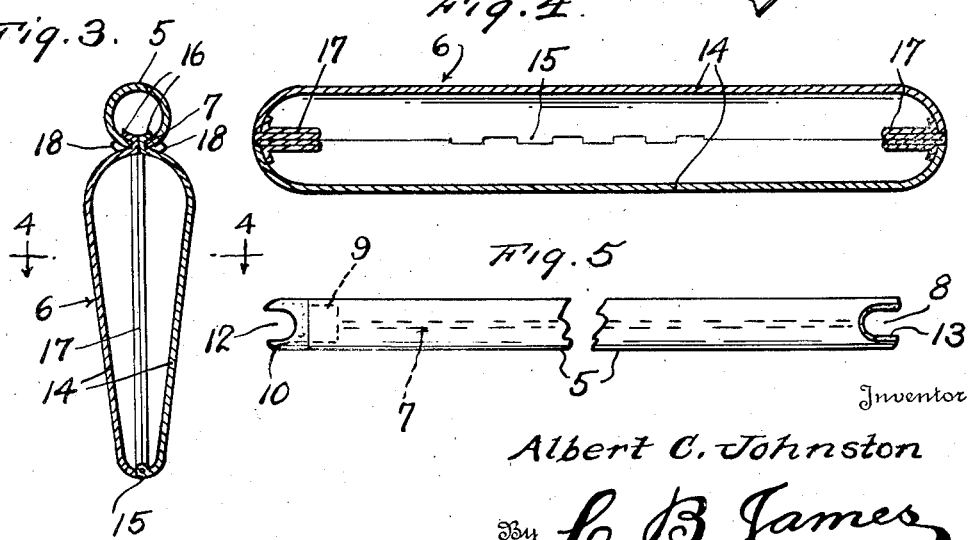
Inventor
Albert C. Johnston
By L. B. James
Attorney July 18, 1944. A. C. JOHNSTON 2,354,125
BICYCLE
Filed Sept. 11, 1942 2 Sheets-Sheet 2
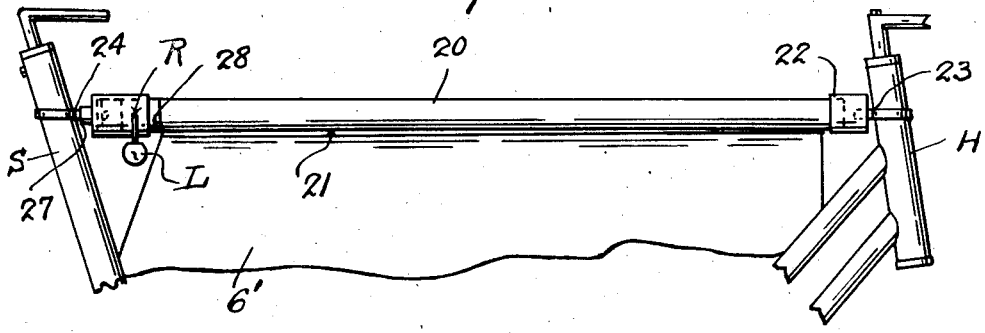
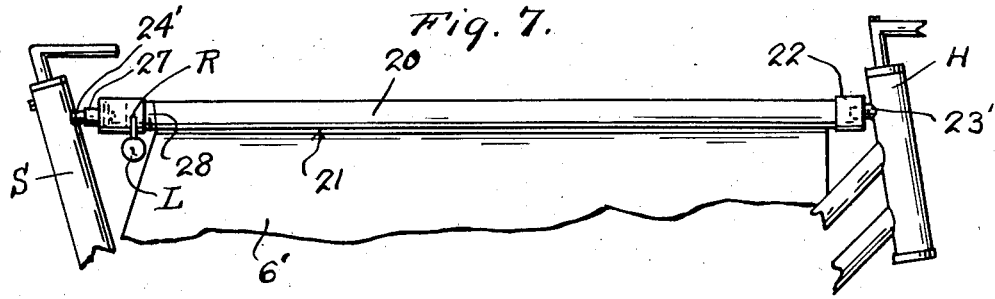
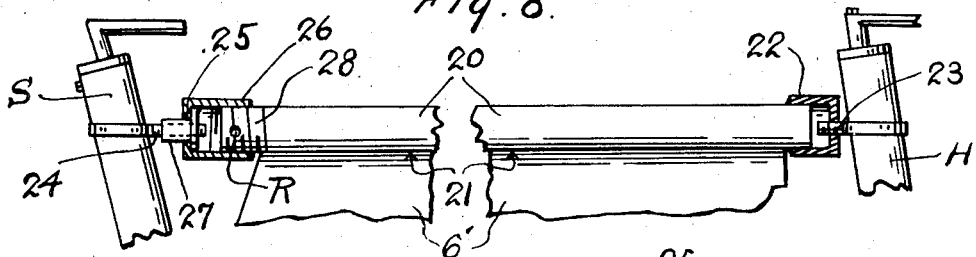
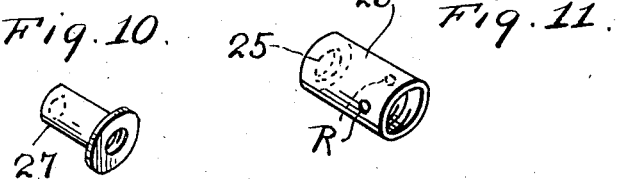
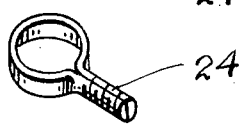
Inventor
Albert C. Johnston
By L. B. James
Attorney Patented July 18, 1944

2,354,125

UNITED STATES PATENT OFFICE 2,354,125

BICYCLE

Albert C. Johnston, Waco, Tex.

Application September 11, 1942, Serial No. 458,008

2 Claims. (Cl. 280—7.11)

This invention relates to bicycles and more particularly ladies' bicycles.

The primary object of this invention resides in the provision of means whereby a lady's bicycle can be converted into a man's bicycle without mechanical alteration thereof.

Another object of this invention resides in constructing a cross-bar for ladies' bicycles so it can be readily disposed in operative position and removed therefrom without the use of tools.

A further object of this invention resides in constructing the cross-bar so as to be used for carrying small tools and the like.

A still further object of this invention resides in constructing the cross-bar so as to removably support an article carrying receptacle.

Aside from the aforesaid objects this invention resides in the particular construction of the cross-bar and article carrying receptacle including the manner of assembling the same for disposition on ladies' bicycles.

A still further object of the invention is to provide for added strength of ladies' bicycles, when desirable, by so constructing the cross-bar and the receptacles at either end that it may be screwed into either end, by means of a swivel joint in the center of the bar, and locked, if desired.

It is also an object of the invention to save material by having all bicycles manufactured as ladies' bicycles, with the connections for the removable bar made into the frames, thus making it unnecessary for a dealer to carry duplicate models in stock; and to accomplish the same purpose as to bicycles already manufactured by providing like connections to be fastened with a metal strap to the bicycle frame; thus accomplishing both economy and security of items carried in such container.

It is a further object of the invention that the removable bar may be made large enough in itself to carry a small pump and tool kit, and be sold separately from the container when desired.

With these and other objects in view this invention resides in certain novel features of construction and arrangement of elements to be hereinafter more particularly set forth in the specification, illustrated in the accompanying drawings and pointed out in the appended claims and, while this disclosure depicts my present conception of the invention, the right is reserved to resort to such changes in construction and arrangement of elements as come within the spirit of the invention.

In the accompanying drawings forming a part of this application:

Fig. 1 is a side view of a lady's bicycle.

Fig. 2 is an enlarged longitudinal sectional view of the cross-bar and upper portion of the article carrying receptacle disposed on a lady's bicycle.

Fig. 3 is an enlarged sectional view through the cross-bar and receptacle taken approximately on line 3—3 of Fig. 1.

Fig. 4 is a similar view taken approximately on line 4—4 of Fig. 3.

Fig. 5 is a plan view of the cross-bar.

Fig. 6 is a side view of a portion of a lady's bicycle showing a modified form of the removable cross-bar.

Fig. 7 is a similar view of the cross-bar as being connected to the bicycle by a modified form of attaching elements.

Fig. 8 is an enlarged side view of the cross-bar in position on a lady's bicycle and partly in section.

Figs. 9, 10 and 11 are perspective views of the rear securing elements of the cross-bar shown in Fig. 6.

In the present illustration of this invention the letter A designates, in general, a lady's bicycle which, among other well known parts, consists of a head H and upright seat-post receiving member S.

Removably disposed across the usual space between the head H and member S is a hollow cross-bar 5 constructed of any suitable material, the same is provided with a longitudinally extending slot 7 in its lower side and has its front end 8 cut out and padded as indicated by the numeral 13 to straddle the head H. The rear end 9 of the cross-bar is open and provided with a rubber plug 10 having a forked shape outer end 12 adapted to straddle the member S and yieldingly retain the cross-bar between the same and head H to simulate a man's bicycle and, while a rubber plug is herein recited to perform the aforesaid functions, it is to be understood other means, such as a spring or the like may be substituted therefor without departing from the spirit of the invention.

Adapted to be associated with the cross-bar, to facilitate carrying packages, bathing suits and the like, is a receptacle 6 constructed of suitable material and consisting of side members 14 which are hinged at their lower ends as indicated by the numeral 15 and provided with flanges 16 at their upper ends for sliding over the slot 7 and within the cross-bar to retain the receptacle in operative relation therewith, said receptacle is also provided with lugs 18 adapted to bear against the outer periphery of the crossbar to prevent lateral swinging thereof within space between the head H and member S of the bicycle. The forward and rear ends of the receptacle are closed by accordion like members 17 to permit the sides thereof to be swung open when the receptacle is removed from the crossbar, however it is within the purview of this invention to slidably overlap the ends and pad the outer surfaces thereof to prevent scratching the frame of the bicycle.

In the modified form of this invention as illustrated in Figs. 6, 8, 9, 10 and 11, the numeral 20 designates a cross-bar having a longitudinally extending slot 21 formed in its lower side to support a receptacle 6' of similar construction as that shown in the preferred form of the invention, said cross-bar 20 having a threaded sleeve 22 secured to its forward end to receive a threaded stud 23 removably secured as indicated in Figs. 6 and 8 to the heads of ladies' bicycles already manufactured.

Removably secured to the member S of the bicycle, as illustrated in Figs. 6 and 8 of the drawings, is a threaded stud 24 adapted to extend through an aperture 25 in an internally threaded sleeve 26 for threaded reception of an elongated collar 27 which rotatably supports the sleeve 26 thereon, said threads of the sleeve are adapted to engage threads 28 on the rear end of the cross-bar to retain it in rigid position between the head H and member S.

In Fig. 7 of the drawings opposed studs 23' and 24' are welded or otherwise secured to the head H and seat-post receiving member S of the bicycle to fasten the cross-bar therebetween in the manner heretofore set forth.

The cross-bar, supporting the receptacle 6' is locked against dislodgement from its position between the head H and member S as by passing the yoke of a lock L through registering apertures R in the sleeve and rear threaded end of the cross bar.

In order to dispose the aforesaid modified form of cross-bar on a lady's bicycle, the forward end thereof is screwed on that stud carried by the head of the bicycle, whereupon the rear threaded end thereof is aligned with the sleeve 26 and the sleeve then screwed thereon until sufficiently tight subsequent to which the sleeve and cross-bar are locked, at which time removal or opening of the receptacle is prevented.

With this invention fully set forth it is manifest means are provided to promote the utility of ladies' bicycles and, through the simplicity of the same, the cost thereof will be reasonable and much vital material will be saved by avoiding the necessity of carrying dual models in stock; through the lady's bicycle being converted readily into a man's bicycle, with added strength and convenience, and enabling many ladies' bicycles already sold to be used as men's bicycles, which otherwise would be idle much of the time.

Having thus described my invention what I claim and desire to protect by Letters Patent is:

1. A removable cross-bar of tubular material for ladies' bicycles having one end of fork shape configuration and padded and its opposite end open, and a resilient plug removably inserted in the open end of the cross-bar and having its outer end of fork shape configuration.

2. The combination with a tubular cross-bar for ladies' bicycles having one end open and a slot formed in its lower side extending from said open end toward its opposite end, a receptacle formed of opposed hinged sections having a portion of each section removably inserted in the aforesaid slot, oppositely extending flanges formed on those portions of the receptacles disposed in the slot resting on the inner lower wall of the cross-bar, and attaching means removably securing the cross-bar to the bicycle.

ALBERT C. JOHNSTON.